United States Patent [19]

Thurm et al.

[11]  4,279,502

[45]  Jul. 21, 1981

[54] METHOD OF AND APPARATUS FOR DETERMINING THE COPYING LIGHT AMOUNTS FOR COPYING FROM COLOR ORIGINALS

[75] Inventors: Siegfried Thurm, Voiswinkel; Konrad Bunge, Cologne; Günter Findeis, Sauerlach, all of Fed. Rep. of Germany

[73] Assignee: AGFA-Gevaert, A.G., Leverkusen, Fed. Rep. of Germany

[21] Appl. No.: 74,331

[22] Filed: Sep. 11, 1979

[30] Foreign Application Priority Data

Sep. 15, 1978 [DE] Fed. Rep. of Germany ....... 2840287
Mar. 20, 1979 [DE] Fed. Rep. of Germany ....... 2912130

[51] Int. Cl.³ ............................................. G03B 27/73
[52] U.S. Cl. ........................................ 355/38; 355/77
[58] Field of Search ................................... 355/35–38, 355/77, 88

[56] References Cited

U.S. PATENT DOCUMENTS

| | | | |
|---|---|---|---|
| 3,888,580 | 6/1975 | Amano et al. | 355/38 |
| 4,101,216 | 7/1978 | Grossman | 355/38 |
| 4,150,894 | 4/1979 | Meyer et al. | 355/38 |
| 4,192,605 | 3/1980 | Fergg et al. | 355/38 |

FOREIGN PATENT DOCUMENTS

1914360 10/1970 Fed. Rep. of Germany .

*Primary Examiner*—L. T. Hix
*Assistant Examiner*—W. J. Brady
*Attorney, Agent, or Firm*—Peter K. Kontler

[57] ABSTRACT

A method of determining the amounts of light in the basic colors to which an original is to be exposed during a color copying operation to obtain a copy the colors of which are matched in dependence on the image recorded on the original includes the establishment of color density difference functional correlations from values denoting the results of measurements at a multitude of regions of the film strip which includes the original in question. The correlations can then be used for determining the light amounts for most of the originals. Furthermore, the originals are evaluated for discrimination between daylight and artificial light exposures as well as for recognition of originals including color dominants and, in the latter instance, also for ascertaining whether the color dominant was caused by image-important features. The originals which have been classified as artificial light exposures or as including color dominants are treated as such, and the light amounts used for mating copies therefrom are selected differently from those applied when the originals were classified as daylight exposures or do not include color dominants. The signals attributable to detection of the color dominants may be given higher or lower weight, in dependence on the subject matter which they represent, and certain empirical or threshold values may be used to influence the light amount selecting process.

34 Claims, 4 Drawing Figures

METHOD OF AND APPARATUS FOR DETERMINING THE COPYING LIGHT AMOUNTS FOR COPYING FROM COLOR ORIGINALS

BACKGROUND OF THE INVENTION

The invention relates to a method of and an arrangement for determining the individually controllable amounts of light in various colors to which photographic copying material is to be exposed in a color copying operation from a length of photographic original material including a series of discrete image-carrying sections, especially from a film strip including a series of color negatives. More particularly, the present invention relates to a method and an apparatus of the above type wherein the density of the original material in three basic colors is individually photoelectrically measured at a plurality of regions of the original material, and wherein the results of measurements are used for controlling the amount of copying light in the color copying operation.

A widely used method for determining the amounts of copying light is based on the recognition of the fact that, in most instances, satisfactory color copies are obtained when the amounts of copying light in the three colors are so controlled that a neutral gray results in the copy independently of the color composition of the original being copied. This assumption is substantially valid as long as no large areas of the same color, so-called color dominants, are present in the original from which the copy is to be made. On the other hand, when the original has such a dominant, this dominant is suppressed by very non-uniform measuring of the copying light amounts in the individual colors to such an extent that again neutral gray is obtained for the copy. Therefore, in the event of existence of such a color dominant, the neutral gray compensation which is well suited for the elimination of color casts, results in improper exposure of the copying material to the light in the various colors during the copying operation and, hence, the copies from originals including such color dominants are unsatisfactory.

In a color copying method described in the German published application Ser. No. 19 14 360, the neutral gray compensation is not limited to a single negative; rather, it is applied to a large number of originals which are treated in the same way as, for instance, within the same film strip. In this manner, there is obtained a compensation for a color cast or tinge which occurs in the particular film strip or in a large number of consecutive negatives of the same film strip. The existence of the aforementioned tinge or cast may be attributable, for instance, to the peculiarities of the film emulsion, to the changes which may take place during the storage of the film strip prior to or subsequent to exposure, or to errors occurring during the development of the original film strip. Then, the color dominants which are present in the individual image-carrying sections, for instance negatives, and whch are attributable to the theme of the respective image, are reproduced in a satisfactory manner, inasmuch as such color dominants usually appear, in the same color, only in some of the color-carrying sections of the original material and, therefore, the influence of such color dominants is hardly felt in the summation of the individual color values. However, experience has shown that a control of the color exposures only based on the averaging of the results of measurements applicable to the entire film strip, which is completely suitable in many instances, does not achieve satisfactory results for all possible original materials, especially when such original materials include image-carrying sections which have drastically different average densities. This may be attributable to the fact that, in most instances, the photosensitive materials have color errors which are dependent on the density.

OBJECTS AND SUMMARY OF THE INVENTION

It is an object of the present invention to provide a method of determining the individually controllable amounts of light in various colors to which photographic copying material is to be exposed in a color copying operation, which does not exhibit the disadvantages of the prior-art methods of this type.

Another object of the present invention is to provide a method according to which image-carrying sections of a photographic original material of different average densities can be automatically copied in an optimal manner.

A concomitant object of the present invention is to provide an apparatus for the practice of the above method which is capable of accomplishing the above-mentioned objects to satisfaction.

One feature of the present invention resides in the provision of a method of determining the individually controllable amounts of light in various colors to which photographic copying material is to be exposed in a color copying operation from a length of photographic original material including a series of discrete image-carrying sections, especially from a film strip including a series of color negatives, which method comprises the steps of individually photoelectrically measuring the density of the original material in three basic colors at a plurality of regions of the original material, establishing for each of the measured regions a difference between the density values in two of the basic colors and an average density in all three basic colors, and forming or establishing a functional correlation relationship of the proportions of the difference to the respective average density for a number of the regions of the original material for use as values specific to the length of the original material for influencing the light amount control in the color copying operation.

Advantageously, the method of the present invention further comprises the steps of establishing for each of the measured regions another difference between the density values in one of the two basic colors and remaining basic color, and forming another functional correlation of the proportions of the other difference to the average density for at least some of the regions of the original material for use as additional values speoific to the length of the original material for influencing the light amount control in the color copying operation. It is further advantageous when at least one, but preferably both, of the forming steps includes forming a color difference curve. Advantageously, the density values related to the respective image-carrying sections are evaluated for use as values specific to such sections for influencing the light amount control in the color copying operation.

As a result of the determination of the functional correlations of the color density differences of the length of the original material on which the section to be copied is situated, and from which the values specific to the length of the original material which are applicable to the section to be copied, and the combination, in accordance with the invention, of these values with the values derived from the monitoring of the section to be copied, it is achieved, by resorting to the use of the so-called neutral gray compensation, that color deviations which are caused by the photosensitive material of the original (errors specific to the film) as well as color deviations which are caused by the theme of the respective image, for instance, exposure which is not in accordance with the type of the photosensitive material of the original (errors specific to image), are corrected.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
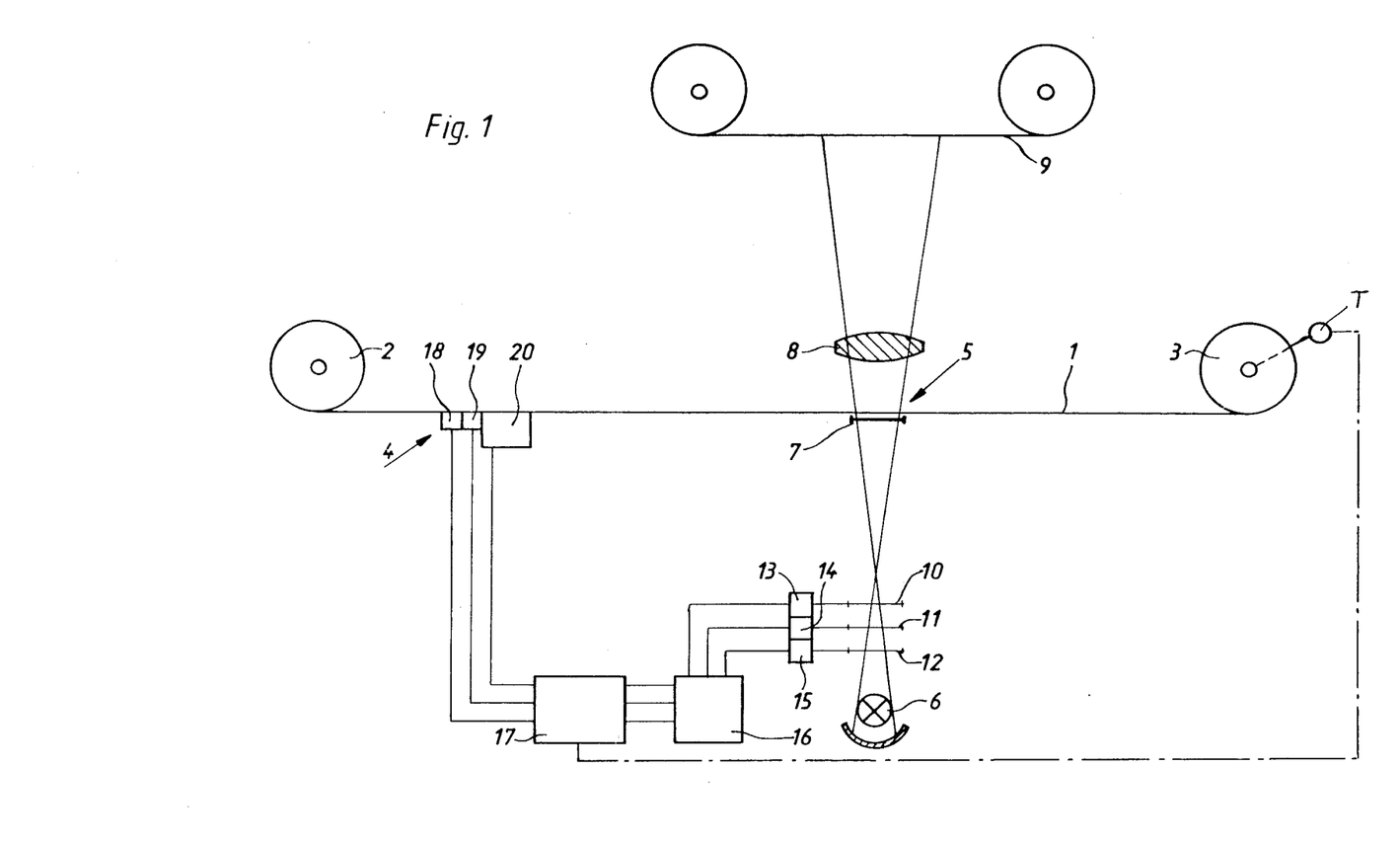
FIG. 1 is a diagrammatic view of a color-copying machine which employs a light-determining apparatus of the present invention.

Referring first to FIG. 1 the reference numeral 1 denotes a photographic original strip which consists of a plurality of individual film strips or lengths which are connected, especially glued, to one another at their respective ends. The original band 1 is withdrawn from a pay-out reel 2 by means of a conventional transporting arrangement which is not illustrated, and is taken up on a take-up reel 3. During its advancement from the pay-out reel 2 to the take-up reel 3, the original strip passes a measuring or monitoring station 4 and a copying station 5. The measuring station 4 is located at a suitable distance upstream of the copying station 5, especially at a distance which at least matches to the length of the longest film strip which can be handled by the copying station 5. This distance can be achieved by either physically arranging the measuring station 4 upstream of the copying station 5 at this distance, or by placing the measuring station 4 closer to the copying station 5 and by permitting or causing the original band 1 to form at least one loop intermediate the measuring station 4 and the copying station 5. So, for instance, a temporary accumulator of a conventional construction may be located between the measuring station 4 and the copying station 5.

The copying station 5 is illustrated only to the extent necessary for understanding the present invention. As illustrated, it includes a light source 6, a support 7 for a section of the original band 1, an optical system 8, light-sensitive copying material 9, and three subtractive color filters 10, 11 and 12 which are arranged between the light source 6 and the support 7. The color filters 10, 11 and 12 are connected to and displaceable by individual positioning motors 13, 14 and 15 which are controlled by a control arrangement 16. The control arrangement 16, in turn, is connected with an evaluating arrangement 17 which is so connected to the measuring station 4 as to receive information, data and/or signals therefrom. The measuring station 4 includes an arrangement 18 capable of determining the presence of glued zones (splices) of the original band 1, a device or arrangement 19 for determining the presence on the original band 1 of notches or perforations, and a measuring or monitoring arrangement 20 capable of measuring or monitoring color density of the respective regions of the original band 1. The color density measuring arrangement 20 measures the optical density of the original material in the blue, green and red colors. For each measured region of the original material 1, the values denoting the results of measurements in the three colors are derived from different sub-regions.

Figure 2:
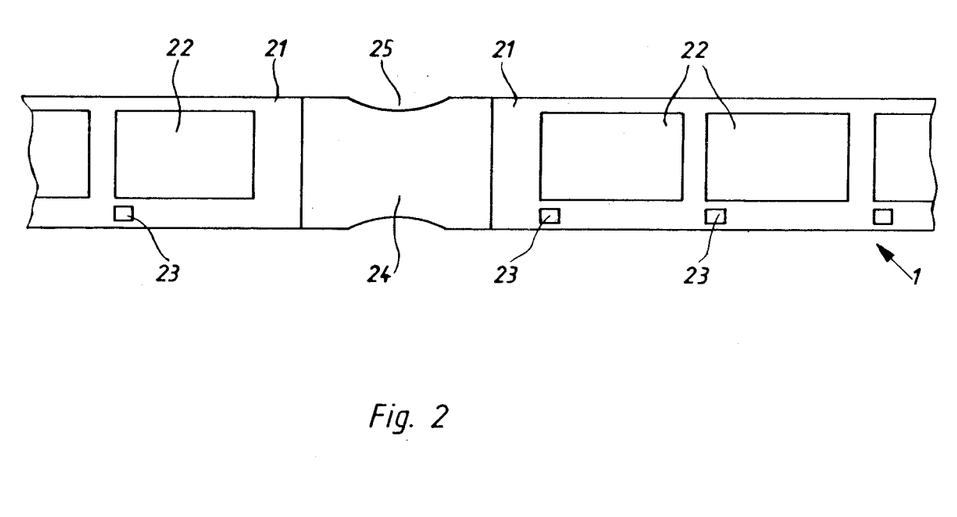
FIG. 2 is a top plan view of a fragment of a photographic original material shown in FIG. 1.

FIG. 2 illustrates a fragment of the original band 1, the fragment including a connection at a glued location 24 between the ends of two film strips or films 21. Furthermore, FIG. 2 illustrates individual image-carry sections 22 as well as perforations 23 of the films 21. Instead of the films 21 which are provided with the perforations 23, even films with shaped marginal notches could, of course, be treated in accordance with the method of the present invention. It will be appreciated that only the operation of the arrangement 19 and particularly its cooperation with the evaluating arrangement 20 and, eventually, with the copying station 5, would depend on the spacing of the perforations 23 or the non-illustrated marginal notches. This cooperation of the arrangement 19 with the copying station 5 is conventional and thus will not be discussed in detail herein. It is sufficient to mention that it renders it possible to properly position the individual image-carrying sections 22 relative to the support 7 and, consequently, relative to the beam of light travelling between the source 6 and the copying material 9. Finally, FIG. 2 also illustrates another notch 25 which is situated at the splice 24.

The original band 1 is withdrawn from the pay-out reel 2 by the transporting arrangement, which is only diagrammatically indicated in FIG. 1 at T and which, as mentioned before, is conventional. The operation of the transporting arrangement T is controlled, in a manner which is also conventional, by the evaluating arrangement 17. Hence, only the connection of the evaluating arrangement 17 with the transporting arrangement T has been indicated in FIG. 1 by a phantom line. As the original is advanced by the transporting arrangement T, different regions of the respective film strip 21 (or, eventually, of the next film strip 21) become juxtaposed with the arrangements 18, 19 and 20 of the measuring station 4. At appropriate moments, the arrangement 18 detects the presence of the splice 24 and a signal indicative of the detection of this splice and thus of the end of a particular film strip 21 or the beginning of the succeeding strip is transmitted to the evaluating arrangement 17. The arrangement 19 detects the presence or absence of the perforations 23 or the notches, and corresponding signals are also transmitted to the evaluating arrangement 17 to enable the latter to ascertain the proper position of the image-carrying section 22 relative to the support 7.

At the color density measuring arrangement 20, which is arranged at a predetermined distance downstream of the arrangement 19, regions of the image-carrying sections 22 of the respective film strip 21 are measured or monitored as to their respective optical densities in the blue, green and red colors. As mentioned before, values denoting the results of measurements are derived for each of the sections 22 at different partial regions in each of the three colors. However, in a simplified arrangement, only one value can be derived in each color for each section 22. Signals denoting these values are also transmitted to the evaluating arrangement 17 and are stored thereat. The arrangement 17 also provides for correlation of data denoting the results of measurements to the respective sections 22 and that of the section 22 to a film strip 21.

The actual copying operation takes place in the copying station 5 in a customary manner. It will be appreciated that the first or leading section 22 of a film strip 21 reaches the support 7 of the copying station 5 only when the last section 22 to be copied of the same film strip 21 has already left the measuring station 4, as a result of which all measurement values of all of the sections 22 of the particular film strip 21 are stored in the evaluating arrangement 17 prior to the commencement of the actual copying operation in the copying station 5. The amounts of light in the various colors are controlled by means of the color filters 10, 11 and 12 which can be introduced into the path of light travelling between the source 6 and the copying material 9, by operating the respective positioning motors 13, 14 and 15, as a result of which the exposure to light to the particular color is terminated. The positioning motors 13, 14 and 15 are controlled by the control arrangement 16 which, in turn, is controlled by the evaluating arrangement 17 in accordance with certain criteria which will be discussed in detail later on.

Figure 3A:
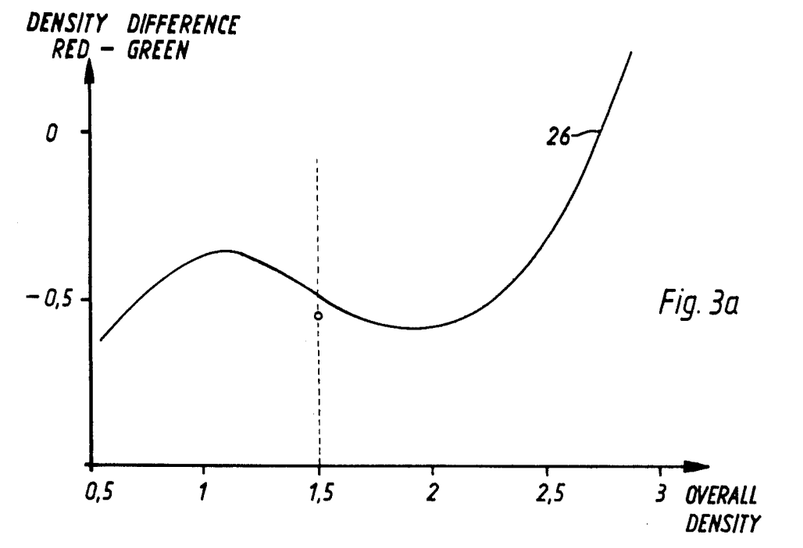
FIGS. 3a and 3b are grahic representations of color density differences in curves indicative of density differences between red and green and blue and green respectively.
Figure 3B:
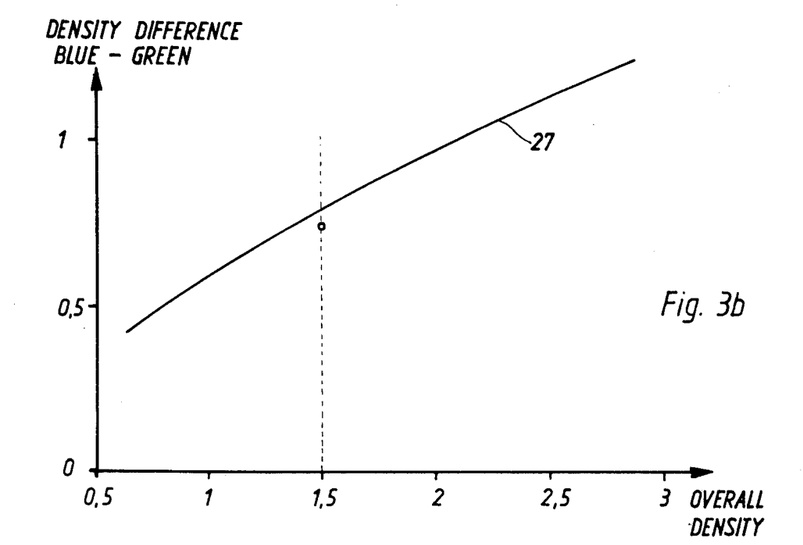

FIGS. 3a and 3b illustrate two different color density difference curves. The individual curves have been obtained on the basis of measuring more than 6,500 partial regions or points of the respective film strip 21. The curves are plotted in the following manner:

The transparency in each color which is measured at a particular partial region or point is first converted in a logarithmic analog to digital converter into a density value. Then, an arithmetic average is formed from the three color density values, and differences are formed between the color densities in red and green, on the one hand, and in blue and green, on the other hand. For instance, when the average density amounts to 1.5 and the density difference red minus green amounts to 0.521, a corresponding point is entered in the system of coordinates shown in FIG. 3a. In a similar manner, a density difference blue minus green amounting, for instance, to 0.708 is entered in the system of coordinates of FIG. 3b above the overall density 1.5. This procedure is repeated for each of the partial regions or points of the respective section 22, and eventually for all of the sections 22 of the same film strip 21. Of course, it can happen that the same density differences are obtained more than once for the respective average densities. Consequently, the illustrated color density difference curves 26 for the red minus green difference and 27 for the blue minus green difference constitute respective indications of the frequency of the individual color density differences relative to the average densities. This procedure is performed by the evaluating arrangement 17 which advantageously includes a microprocessor which is capable of also approximating the mathematical function which is representative of the respective curve 26 or 27 in the form of a polynomial of a third or second order.

It is very advantageous when the evaluating arrangement 17, in addition to the microprocessor, includes at least one storage in which the respective values representative of the mathematical function describing the respective color difference curve are stored and from which information can be derived for use by the microprocessor in transmitting commands to the control arrangement 16 and thus for determining the amount of light in the various colors to which the section 22 on the support 7 will be exposed during the color copying operation.

As mentioned before, the operation of the evaluating arrangement 17 is performed in accordance with certain criteria. Advantageously, in accordance with a currently preferred exemplary embodiment of the method of the present invention, the evaluating arrangement 17 operates in the following manner. In order to simplify the explanation, the following abbreviations are used below to represent the following parameters:

$b$ = blue color density
$g$ = green color density
$r$ = red color density
$d$ = overall density, i.e., average values of the color densities b g, and f for blue, green and red colors
$bg = b-g$
$rg = r-g$
$br = b-r$
$p$ = values which relate to a partial region of an original section 22
$v$ = values which relate to the entire original section 22
$f$ = values which relate to a film strip 21 which is constituted by the individual sections 22
$k$ = values which are used for the final determination of the copying light amounts The present invention is based on the use of the so-called gray equivalency principle which states that the light in the three basic colors, that is, blue, green and red, is in a predetermined proportion to one another for the predominant number of image-carrying sections 22. As a result of this, even the proportion of the transparencies of the image-carrying sections 22, which correspond to the differences in the optical densities, in the blue, green and red colors, must have predetermined values. Exceptions to this rule are constituted by image-carrying sections 22 which either carry images of objects which deviate from the gray equivalency principle to an espcially great extent (color dominants), or which have been exposed under light conditions which are non-specific for the original material. In the latter instance, one refers to a light-related color cast. The latter is especially pronounced in a color negative which is intended for taking images in daylight but has been exposed in artificial light.

Aside from the above-mentioned exceptions, the aforementioned equality of the color density differences of the sections 22 within a film strip 21 is valid only for image-carrying sections 22 which have the same average density. The latter value is derived as an arithmetic mean of the three color densities. In the example discussed below, it is assumed that the measurement of the color densities is performed at a plurality of partial regions of each image-carrying section 22. However, it is to be expressly mentioned that the subdivision of the image-carrying sections 22 into partial regions is not mandatory for the performance of the method of the present invention. In an extreme case, one region can correspond to an entire image-carrying section 22.

Two pairs of values (pbg, pd) and (prg, pd) can be assigned to each of these regions. Then, based on these value pairs, there can be established a correlation between the color density differences bg and rg, on the one hand, and the average density d, on the other hand, in the exposure range utilized by the images recorded on a film 21. This correlation denotes the color behavior or response of the original material 21 and it can be approximated by a mathematical function.

At the beginning of the evaluating operation performed on the values denoting the results of monitoring of an image-carrying section 21 there is obtained the value vd by an arithmetic averaging of all of the values pd associated with the respective section 22. The value vd represents the average density of the entire section 22.

Now, during the following determination of the color density difference curves, the values of the results of measurements of such original sections 22 which were formed under exposure conditions which did not correspond to the type of the original material, or such measuring values which are influenced by an image of an object having a pronounced color (color dominant) are to be eliminated.

The recognition of these two exceptions is discussed immediately below. An image which was produced under artificial light conditions is best recognized by the color density differences br which significantly differ from those of the other images, in view of the fact that the light intensities of the exposure light in the blue and red ranges of the spectrum strongly differ in this instance from those of images made under daylight conditions. For the less frequent situation wherein daylight exposures were made on material which is intended for making exposures in artificial light, the same approach is valid, except that an opposite sign is to be applied thereto.

Initially, the values of the results of measurements of those regions in which $$pd < mind$$

are eliminated from consideration. Herein, "mind" is a quantity which exceeds by a certain amount, in a preferred example by 0.06, the value d of the unexposed film 21. As a result of this, the values of the results of measurement of such partial regions which have not been exposed or have only been exposed to a small extent are eliminated from the determination or recognition of artificial light exposures, inasmuch as these regions do not differ in artificial light and daylight exposures and thus cannot contribute to differentiation between the types of image-carrying sections 22.

The values are examined for the remaining values of the results of measurement of the respective section 22. Inasmuch as the deviations of artificial light exposures from the daylight exposures become more prominent with an increasing degree of exposure of the respective partial region, the remaining measuring values are first distributed between or assigned to a plurality of, preferably two, classes. In the latter instance, those partial regions for which applied $pd \leq dK1$ are assigned to class K1, wherein dK1 is a predetermined quantity which, in a special case, exceeds the average density of the unexposed original material 21 by 0.2. The remaining partial regions are assigned to class K2 which is complementary to the class K1. Furthermore, the values which are assigned to the classes K1 and K2 are further assigned within these classes K1 and K2 to sub-classes UK1 and UK2. For the values of UK1, it applies $pbr < K1,2br$, while the sub-class UK2 includes those values which are complementary thereto. Herein, K1,2br are predetermined comparison quantities which, in a preferred example, amount to 0.7 and 1, respectively.

In the following, these sub-classes will be referred to as UK (I,J), wherein I stands for the previously mentioned classes, and J stands for the previously mentioned sub-classes. The UK (1,1) includes partial regions about which it is to be assumed, based on their color density differences pbr, that the exposure light deviated from daylight and that, consequently, the quantity pbr is smaller than the comparison quantity K1,2br. Now, an arithmetic mean value of the quantities pbr is established within the four sub-classes UK (I,J). In this manner, there are obtained the corresponding values UKbr (I,J). Furthermore, there is determined the number Z of the partial regions which are assigned to the respective sub-classes UK (I,J), the respective numbers being designated as ZUK (I,J). Accordingly, for each of the sections 22, there are obtained four values: UKbr (I,J) and ZUK (I,J). Now, a particular section 22 is classified as an artificial light exposure when the following conditions are met:

| | | |
|---|---|---|
| ZUK (1,1) | $\geq$ ZUK (1,2) | (1) |
| ZUK (2,1) | $\geq$ ZUK (2,2) | |
| UKbr (i,1) | < brmin (I,1). | |

Herein, the equality sign is only valid when ZUK (I,1)=0, and brmin (I,1) is predetermined.

For sections 22 which are classified in this manner as artificial light exposures, there are calculated the quantities UKbg (I,1) and UKrg (I,1) by the averaging of the values pbg and prg of the partial regions belonging to UK (I,1). In the following evaluation, these sections 22 are handled differently from the remaining sections 22 in the following manner: If only one of the two sub-classes UK (I,1) is occupied, it applies:

When ZUK (1,1)=0 and ZUK (2,1)=0, then vbg=UKbg (1,1) and vrg=UKrg (1,1);

when ZUK (1,1)=0 and ZUK (2,1)=0, then vbg=UKbg (2,1) and vrg=UKrg (2,1).

If both UK (I,1) are occupied, it applies:

ubg=[(1−cl)·UKbg(1,1)+cl·Ukbg(2,1)]; and analogously for vrg.

Herein, cl is a freely selectable parameter between 0 and 1 and, in the described embodiment, it was selected at 0.5. The copying light amounts are then determined from the quantities vbg and vrg in a manner which will be discussed later.

Thereafter, the values of the results of measurement the remaining sections 22 are examined in order to establish whether or not they fulfill the following conditions:

| | | | |
|---|---|---|---|
| minbg | $\leq$ pbg | $\leq$ maxbg | (2) |
| minrg | $\leq$ prg | $\leq$ maxrg. | |

The minimum and maximum values of bg or rg are so selected that all color density differences which are caused by a color cast of the original material 21 and by objects which do not have prominent colors satisfy these conditions. The values of pbg and prg which do not satisfy the above conditions (2) are caused by objects having very prominent colors (color dominants) and thus are not considered during the determination of the color density difference curves. For each section 22, there are established values vbg and vrg which are specific to the respective section 22, in that an average is obtained of the values pbg and prg of the partial regions of the respective section 22 which satisfy the conditions (2). In addition thereto, the values pbg and prg are entered into a graph (FIGS. 3a and 3b) as functions of pd. All those sections 22 of the original material 21 which have not been classified as artificial light exposures are treated in this manner so that, after the evaluation of the values of the results of measurement of the respective original material 21, there are made available the values vbg, vrg and vd for each section 22, as well as two graphs (or corresponding parameters in the storage of the evaluation arrangement 17) for the respective original material 21. In a modified embodiment, even the quantities pb, pg and pr can be entered as functions of pd. In the latter event, it is proceeded analogously to the discussed procedure.

The correlation between the quantities pbg or prg and pd can be approximated by a mathematical function. As an auxiliary condition, it is mandated in an example of the embodiment that the values of pbg and prg of the values with the lowest pd within the respective film 21 be considered as being predetermined; this means that the curve of the approximating mathematical function must pass through the corresponding points of the graphic representation. This occurs when it is assumed that this value denotes the color density differences of unexposed original material 21. In addition thereto, only such values are utilized in forming the mathematical function for which pd≦vd of the section 22 having the highest vd within a particular film 21. In this manner, it is avoided that the approximating procedure could be influenced by individual values of very high density pd. In a currently preferred embodiment of the invention, the bg curve is approximated by a polynomial of the second order, and the rg curve by a polynomial of the third order.

This calculating process is preferably accomplished by a computer, especially a microprocessor which, based on the available color density difference values in correlation to the associated average densities, causes the polynomial curve to approach the ideal curve in a number of runs performed in accordance with the method of the smallest squares, the degree of approximation improving in each subsequent run. Such a procedure is described in the magazine Soc. Indust. Appl. Math. Rev., 1961, in an article by J. E. L. Peck entitled "Polynomial Curve Fitting with Constraint". An algorithm for programming this procedure is commonly known.

By means for this polynomial curve or function, there are thus determined the seven parameters c0,1,2bg and c0,1,2,3rg for the color properties of the original material or film 21 which describe the color density difference curves.

In a refinement of the method of the present invention, the following quantities are obtained for the measurement values used for achieving the approximation:

$$ppbg = c0bg + c1bg \cdot pd + c2bg \cdot (pd)^2 \quad (3)$$
$$pprg = c0rg + c1rg \cdot pd + c2rg \cdot (pd)^2 + c3rg \cdot (pd)^3$$

Those values wherein prg and pbg do not satisfy the conditions:

$$|pbg - ppbg| < a1$$
$$|prg - pprg| < a2,$$

that is, the values prg and pbg of which very strongly deviate from the approximating curves, are not considered during the further approximation of the above-discussed type. In a currently preferred embodiment, a1,2 were selected at 0.3 and the number of calculating runs was two. After the end of the determination of the parameters c0,1,2bg and c0,1,2,3rg, it is examined whether the quantity c1bg does not exceed a certain threshold value kippclb; in a special case kippclb=1.0. If this is the case, the film 21 is recognized as one having an especially pronounced density dependent color error and is provided with a marking KIP. Such an examination can also be performed for the remaining parameters c0,2bg and c0,1,2,3.

Furthermore, it is examined whether the parameters do not exceed certain threshold values. These threshold values are indicative of the maximum variations of the color properties of the original film 21 to be copied. When these threshold values are exceeded, it must be assumed that values denoting the results of measurement of partial regions corresponding to especially pronouncedly colored objects have contributed to the approximations of the color density difference curves despite the examination in accordance with the conditions (2). However, such values ought to be excluded. This can especially happen when the partial regions correspond to green-colored objects. Accordingly, when, in the currently preferred embodiment, the following conditions are met:

| | | | | |
|---|---|---|---|---|
| c1b | c1bglim | = | .2 | (4) |
| c2bg | c2bglim | = | .2 | |
| c1rg | c1rglim | = | −1.0 | |
| c2rg | c2rglim | = | 1.0 | |
| c3rg | c3rglim | = | −.2, | | the respective film 21 is provided with a marking GF.

After these examinations, there are found to exist the following kinds of films 21:
1. unmarked
2. marked with KIP
3. marked with GF.

Of course, the markings KIP and FG could be replaced by different markings, and even the films belonging to the first category could be provided with markings, as long as it is assured that it can be determined into which category each particular film 21 belongs.

For the films 21 which belong into the first category, the color density differences characteristic for the sections 22 which have not been classified as artificial light exposures are calculated on the basis of the average density and the parameters c0,1,2bg and c0,1,2,3rg in the following manner:

$$fbg = c0bg + c1bg \cdot vc + d2bg \cdot (vd)^2 \quad (5)$$
$$frg = c0rg + c1rg \cdot vd + c2rg \cdot (vd)^2 + c3rg \cdot (vd)^3$$

For the films 21 which belong into the second category, fbg and frg are not calculated on the basis of the average density vd; rather, they are calculated based on a quantity which represents the average density of a feature which is important in the respective image. Inasmuch as the density of such an important feature recorded on a color film negative 22 usually exceeds the average density of the color negative film 21, a density wvd=vd+0.2 of the image-important feature can be used in the equations (5) instead of the average density vd, in a simple case. Such a procedure already achieves a marked improvement in many copies or prints; however, for the few original sections 22 in which the density of the image-important feature is lower than the average density of the respective section 22, the quality of the copy is impaired when this procedure is resorted to. Consequently, in accordance with a further refinement of the method of the present invention, the quantity wvd can be determined on the basis of analysis of the values denoting the results of measurement of the respective section 22 in a manner which will be discussed below.

Generally speaking, there exist two types of exposures or images in which the average density vd of the respective section 22 or the original material 21 significantly deviates from the density wvd of the image-important feature of the respective section 22:

1. Scenic pictures having large areas corresponding to the sky, which have a high density in the negative 22. In these cases, such partial regions should be taken into consideration only to a small extent during the determination of the average density of the copy, inasmuch as the density of the image-important features (scenery) is lower. The same applies to pictures of views including substantial areas of snow. In both instances, it is advantageous to so adjust the density of these image parts that they are completely or partially in haze.

2. Flashlight exposures with skin areas, especially those of faces. These areas have densities, in the negative 22, which are markedly above the average densities of the respective sections 22. However, in the copies, the density of such areas or features should be markedly above the region of haze; more particularly, the images of such subject matter on the copying material 9 should be reproduced with sharp contours.

In order to differentiate between these two types of exposures or pictures, one can utilize, to advantage, the color density difference curves. In the first instance, the partial regions of the respective section 22 which have high densities correspond to objects having neutral gray to blue color, while the image-important objects recorded on the respective section 22 include red color in the second instance. Consequently, for discriminating between these two types, it is initially determined for which partial regions it applies that $pd > vd + a3$, wherein $a3 = 0.5$. Thereafter, ppbg and pprg are calculated for such pd on the basis of equations (3) and the differences hbg=ppbg-pbg and hrg=pprg-prg are formed. Now, if it applies that $hbg > 0$ and $hrg \approx 0$, that is, when there is found the predominance of the blue color density, then it is established that the picture is of the type 1. On the other hand, if it is valid that $hrg \leq 0$ and $hbg \approx 0$, that is when there is found predominance of the red color density, it is established that the picture is of the type 2. In all other cases, the average density of the copy is determined on the basis of the average density vd of the section 22. For the pictures of the first type, the quantity wvd is determined by averaging over pd while disregarding the values derived from the measurement of partial regions of high density. On the other hand, for the pictures of the second type, the quantity wvd is determined by averaging over pd the values derived from the measurement of partial regions of high density.

In a further refinement of this method, which is especially useful for partial regions the average density of which exceeds the average density of the section 22 of the film 21 which has the highest density, not only the calculated color density difference curves but also certain empirical values which take into consideration the average color behavior of the films 21 to be copied are utilized for the determination of the color. This can be accomplished, for instance, in that the two values are permitted to continuously approach one another. In this manner, it is avoided that, especially in areas of high average density in which only a few measurement values contribute to the establishment of the color density difference curves, the determination of the color of the partial regions would be influenced too strongly by only a few values.

As far as the films 21 are concerned which belong to the third category, the values fbg and frg specific to the respective film 21 are not calculated in accordance with the equations (5), inasmuch as, in this instance, the parameters used therein were excessively influenced by the pronouncedly colored objects. Consequently, fbg and frg are determined, in this case, from color density difference curves which result from the average copying behavior of the film 21 from which copies are to be made. These color density difference curves are fed into the computer in their final form, for instance, as a table.

At the end of this measurement value analysis, there are made available for all of the sections 22 the quantities vd, vbg and vrg which are specific to the individual sections 22, and for those sections 22 which have not been classified as artificial light exposures, additionally the quantities fbg and frg which are specific to the respective film 21. The quantities fbg, frg, vbg and vrg determine the proportions of the copying light in the various colors, while the quantity vd determines the density of the copy.

On the basis of these quantities, there are determined kb, kg, and kr which control the copying light amounts in the blue, green and red colors, respectively. For instance, for those sections or negatives 22 which have been classified as artificial light exposures, these values can be calculated as follows:

$$
\begin{aligned}
kg &= (3 \cdot vd - vbg - vrg)/3 \\
kb &= kg + vbg \\
kr &= kg + vrg
\end{aligned} \quad (6)
$$

For the other sections or negatives 22, kb, kg and kr are calculated as follows:

$$
\begin{aligned}
fg &= (3 \cdot vd - fbg - frg)/3 \\
fb &= fg + fbg \\
fr &= fg + frg \\
vg &= (3 \cdot vd - vbg - vrg)/3 \\
vb &= vg + vbg \\
vr &= vg + vrg \\
kb &= a4b \cdot fb + (1 - a4b) \cdot vb \\
kg &= a4g \cdot fr + (1 - a4g) \cdot vg \\
kr &= a4r \cdot fr + (1 - a4r) \cdot vr
\end{aligned}
$$

The coefficients $a4b,g,r$ determine the respective proportion or amount of contribution of the quantities which are specific to the sections 22 and those which are specific to the respective film 21. They can be predetermined or influenced by the analysis of the sections 22. In the above-discussed exemplary embodiment, the coefficients a4b,g,r are made equal to 0.75 for the sections 22 which belong to films 21 of to the third category (marked GF), which means that the film-specific values are given a greater weight than the section-specific ones, inasmuch as the section-specific values relating to these sections 22 are influenced by the color of the subject matter the image of which has been recorded on the particular section 22. In all other instances, a4b,g,r are set at 0.5.

In an advantageous further development of the method of the present invention, the coefficients a4b,g,r are not constant; rather, they are constituted by functions of fbg−vbg and frg−vrg. In other words, when there is a pronounced difference between the density differences of a section 22 and the corresponding values derived from the color density difference curves, the coefficients a4b,g,r can be set higher than 0.5. Under these circumstances, the film-specific values are assigned a larger weight than the section-specific ones, based on the experience that, for example, when the green proportion predominates in the section-specific data, as a rule, there exists a green dominant in the subject matter which has been recorded on the particular section 22 of the film 21. When the film-specific data are assigned a greater weight, the influence of this color dominant on the copy can be reduced.

The copying light amounts in the three basic colors (as determined by the filters 10, 11, and 12) are determined from the quantities kb,g,r, respectively, by controlling the times of exposure tb,g,r. The copying arrangement 5 which is used for performing the color copying operation is initially calibrated in that a copy is made at exposure times t0b,g,r=t0 from an original having uniform transmission densities d0b,g,r which has been obtained by recording an image of a gray object on the original. The obtained image has a gray color which is identical to that of the object whose image has been recorded. The object could have a different color; however, the calibrating operation is particularly simple and easy to accomplish when the object has the above-discussed gray color. After the calibration, the copying exposure times for a specific section 22 are determined in the following manner:

$$tb,g,r = t0.10[\exp(kb,g,r - d0b,g,r)].$$

The determination of the film-specific values in accordance with the present invention can be also accomplished in the same way when the carrier of the sections which are to be treated in the same manner is not a strip but, for instance, a circular disk.

In the above explanation and discussion of the invention, there is considered exclusively the application of the concepts of the instant invention to the currently customary general method of copying from color negatives or similar originals or image-carrying sections in which each of such sections is copied in its entirety. However, it will be appreciated that the invention is also applicable to such copying operations wherein the respective section is copied regionally, especially point-by-point as it is in a laser-beam copying operation. Then, the procedure which has been explained above in connection with a copying process which was customary at the time of the present invention would be followed in the determination of the copying light amount proportions of the regions or points to be copied in a manner which will be easily appreciated from the above explanation. Under these circumstances, the original to be copied consists of the corresponding image region or image point.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A method of determining the individually controllable amounts of light in various colors to which photographic copying material is to be exposed in a color copying operation from a length of photographic original material including a series of discrete image-carrying sections, especially from a film strip including a series of color negatives, comprising the steps of individually photoelectrically measuring the density of the original material in three basic colors at a plurality of regions of the original material; establishing for each of the measured regions a difference between the density values in two of the basic colors, and an average density in all three basic colors; and forming a functional correlation of the proportions of said difference to the respective average density for a number of said regions of the original material for use as values specific to said length of the original material for influencing the light amount control in the color copying operation.

2. The method as defined in claim 1, further comprising the steps of establishing for each of the measured regions another difference between the density values in one of said two basic colors and the remaining basic color; and forming another functional correlation of the proportions of said other difference to the respective average density for at least some of said regions of the original material for use as additional values specific to said length of the original material for influencing the light amount control in the color copying operation.

3. The method as defined in claim 2, wherein at least one of said forming steps includes forming a color difference curve.

4. The method as defined in claim 3, wherein said color difference curve forming includes averaging the respective difference for each average density.

5. The method as defined in claim 2, wherein at least one of said forming steps includes forming a mathematical function from the respective established density value differences.

6. The method as defined in claim 5, wherein said mathematic function forming includes forming an approximation in the form of polynomials of at least second order.

7. The method as defined in claim 6, wherein the approximation forming includes the use of the method of smallest squares.

8. The method as defined in claim 2, further comprising the step of evaluating the density values related to the respective image-carrying sections for use as values specific to such sections for influencing the light amount control in the color copying operation.

9. The method as defined in claim 8, wherein the measuring step includes measuring the respective section at a multitude of said regions each of which has an area smaller than that of the respective section.

10. The method as defined in claim 8, wherein the measuring step includes measuring the respective section at substantially between 80 and 200 of said regions.

11. The method as defined in claim 8, further comprising the step of eliminating from consideration during said forming step those sections of the original material which have been exposed to light that is at variance with the type of the original material, including classifying the color density values into several density groups, disregarding the values of that group which includes the lowest density values, and comparing the remaining density values and the number of the density values included in the individual groups with threshold values which are predetermined for the various density groups for recognizing and evaluating artificial light exposures as such.

12. The method as defined in claim 11, further comprising the steps of setting, for such sections of the original material which are evaluated in said eliminating step as artificial light exposures, the influence of the values which are specific to said length of the original material on the light amounts in the individual colors to zero, and determining the values which are specific to the respective sections on the basis of characteristic values of the color density differences in the individual density groups.

13. The method as defined in claim 12, wherein said determining includes obtaining the characteristic values from the density groups of high density.

14. The method as defined in claim 8, wherein said forming step includes forming an approximation for the color density difference between the blue and green basic colors as a polynomial of a second order, and an approximation of the density difference between the red and green basic colors as a polynomial of a third order.

15. The method as defined in claim 8, further comprising the step of calibrating, including performing at least said measuring step on a calibrating original having a gray object of uniform density in the three basic colors for its subject matter.

16. The method as defined in claim 8, further comprising the steps of comparing the parameters describing the respective functional correlation with predetermined threshold values and, when the parameters exceed the threshold values, substituting empirical average values for those corresponding to the functional correlation for use as values specific to said length of the original material for influencing the light amount control in the color copying operation.

17. The method as defined in claim 16, wherein said substituting includes utilizing empirical values dependent on the type of the original material.

18. The method as defined in claim 8, further comprising the step of determining the values specific to said length of the original material for a particular section of the original material, including deriving such values from the respective functional correlation based on the average density of this particular section.

19. The method as defined in claim 8, further comprising the steps of comparing the parameters describing the respective functional correlation with predetermined threshold values and, when the parameters exceed the threshold values, utilizing the average density of a dominant feature of the respective section of the original material instead of that of the respective section in its entirety for determining the color difference from the respective functional correlation.

20. The method as defined in claim 19, wherein said comparing step includes so selecting the threshold values that the density of the dominant feature exceeds that of the respective section in its entirety by a predetermined fixed amount.

21. The method as defined in claim 20, wherein said fixed amount is 0.2.

22. The method as defined in claim 8, further comprising the steps of ascertaining the color of a dominant feature of the respective section of the original and, when it is ascertained that the dominant feature is of a particular color, selecting the density to be used for deriving values from the respective functional correlation based on an area of the respective section in accordance with the ascertained color.

23. The method as defined in claim 22, wherein said selecting step includes, when the ascertained color would result in one of blue and gray on the copying material, disregarding the density values of areas of the respective section of the original material having high average density.

24. The method as defined in claim 22, wherein said selecting step includes, when the ascertained color would result in red on the copying material, using the average density value of areas of high average density.

25. The method as defined in claim 22, wherein said ascertaining step includes comparing the measured density values with the values specific to the length of the original material applicable to the zone of the dominant feature as determined on the basis of the respective functional correlation and the average density of the zone.

26. The method as defined in claim 25, further comprising the step of transforming the respective functional correlation, when ascertaining the color of regions of high density, into a modified functional correlation based on empirical values dependent on the type of the original material.

27. The method as defined in claim 26, further comprising the step of performing the transforming step only when the average density of the respective high-density region exceeds the average density of the highest overall density section of the length of the original material on which such high-density region is situated.

28. The method as defined in claim 8, further comprising the step of comparing the parameters of the respective functional correlation with predetermined threshold values and, when the parameters exceed these threshold values, changing the proportion in which the values specific to the length of the original material and those specific to the respective section of the original material contribute to the values to be used for influencing the light amount control in the color copying operation.

29. The method as defined in claim 28, wherein said changing step includes reducing the amount of contribution of the values specific to the respective section of the original material to a factor of 0.25.

30. The method as defined in claim 8, further comprising the step of attributing different weights to the values specific to the length of the original material and those specific to the respective section of the original material in dependence on certain parameters of the original material to be copied.

31. The method as defined in claim 30, wherein said attributing step includes ascertaining the differences between the density values specific to the length of the original material and those specific to the respective section of the original material, and selecting the amounts of contribution of the values specific to the length and those specific to the section in dependence on such differences.

32. An apparatus for determining the individually controllable amounts of light in various colors to which photographic copying material is to be exposed at a copying station in a color copying operation from a length of photographic original material including a series of discrete image-carrying sections, especially from a film strip including a series of color negatives, comprising means arranged upstream of the copying station by a distance at least matching the length of the original material and operative for measuring the density of the original material in three basic colors at a plurality of regions of the original material and for generating signals corresponding to the measured density values; and means for evaluating said signals for use in influencing the light amount control in the copying station, said evaluating means being operative to form functional correlations of differences between the signals corresponding to different ones of the basic colors and average densities based on the measurement of a number of the regions and to determine the amounts of light in the basic colors to which the original material is to be exposed when making a copy from a particular section of the respective length of the original material.

33. An apparatus as defined in claim 32, further comprising means situated at said measuring means and operative for detecting markings on the original material which are indicative of the beginning and end of the particular length of the original material and the positions of the individual sections on the particular length of the original material.

34. An apparatus as defined in claim 32, wherein said evaluating means includes a microprocessor and at least one storage.

* * * * *

UNITED STATES PATENT AND TRADEMARK OFFICE
CERTIFICATE OF CORRECTION

PATENT NO. : 4,279,502
DATED : July 21, 1981
INVENTOR(S) : Siegfried THURM, Konrad BUNGE, and Günter Findeis It is certified that error appears in the above-identified patent and that said Letters Patent are hereby corrected as shown below:

```
     Title page, Item [30], "Mar. 20, 1979" should read
                 --March 28, 1979--.
  Col. 1, line 60, "whch" should read --which--.
  Col. 4, line 50, --1-- should be inserted after
                 "original".
  Col. 5, line 60, "constitute respective" should read
                 --denote--;
          line 61, "indications of" should be deleted.
  Col. 6, line 24, --,-- should be inserted after "b".
  Col. 7, line 38, "measurements" should read
                 --measurement--;
          line 53, --br-- should be inserted after
                 "values" (first occurrence).
  Col. 8, line 47, "ubg" should read --vbg--; and
                 "Ukbg(2,1)" should read --UKbg(2,1)--.
  Col. 9, line 18, "evaluation" should read
                 --evaluating--.
  Col. 11, line 56, "hbg>0" should read --hbg≤0--.
```

Signed and Sealed this

Seventh Day of June 1983

[SEAL]

Attest:

DONALD J. QUIGG

Attesting Officer       Acting Commissioner of Patents and Trademarks